US012692147B2

(12) United States Patent
Maguire et al.

(10) Patent No.: US 12,692,147 B2
(45) Date of Patent: Jul. 28, 2026

(54) LIQUID DELIVERY NOZZLE WITH ANTI-DRIP VALVE

(71) Applicant: Scully Signal Company, Wilmington, MA (US)

(72) Inventors: Daniel W. Maguire, Burlington, MA (US); Francis P. Scully, III, Marblehead, MA (US); Mykhaylo K. Barsukov, Acton, MA (US)

(73) Assignee: Scully Signal Company, Wilmington, MA (US)

( * ) Notice: Subject to any disclaimer, the term of this patent is extended or adjusted under 35 U.S.C. 154(b) by 144 days.

(21) Appl. No.: 18/656,913

(22) Filed: May 7, 2024

(65) Prior Publication Data

US 2025/0346479 A1 Nov. 13, 2025

(51) Int. Cl.
*B67D 7/52* (2010.01)
*B67D 7/04* (2010.01)

(52) U.S. Cl.
CPC *B67D 7/52* (2013.01); *B67D 7/04* (2013.01)

(58) Field of Classification Search
CPC ... B67D 7/52; B67D 7/04; B67D 7/42; B67D 7/44; B67D 7/54
USPC .................. 222/545, 14, 55, 59; 141/311 A; 137/463, 458, 459, 464
See application file for complete search history.

(56) References Cited

U.S. PATENT DOCUMENTS

| | | | | |
|---|---|---|---|---|
| 4,913,200 | A | 4/1990 | Petro | |
| 6,520,222 | B2 * | 2/2003 | Carmack | B67D 7/52 141/311 A |
| 10,669,149 | B2 * | 6/2020 | Gray | B67D 7/54 |

FOREIGN PATENT DOCUMENTS

| | | |
|---|---|---|
| FR | 2714900 A1 | 7/1995 |
| NL | 2013749 B1 | 10/2016 |

OTHER PUBLICATIONS

Dixon, Ball Nozzle for Bulk Delivery with Quick Fill Nut, available at https://dixonvalve.com/en/products/ball-nozzle-bulk-delivery/bl064 (accessed Nov. 15, 2023).
Wissen Research, Patentability Search Report—Fuel Delivery Nozzle, (Nov. 2, 2023).

* cited by examiner

*Primary Examiner* — David J Walczak
(74) *Attorney, Agent, or Firm* — Secant IP, P.L.L.C.

(57) ABSTRACT

A fluid delivery nozzle includes a housing with a handle portion defining an inlet and a transverse portion defining an outlet, where the transverse portion extends transversely to the handle portion and the housing defines a fluid pathway between the inlet and the outlet. A primary valve is in the handle portion and is operable between an open position and a closed position. A secondary valve in the housing is positioned downstream of the primary valve and is operable between an open position and a closed position. The secondary valve includes a shaft fixedly retained in the transverse portion of the housing, a valve seal movable along the shaft, and a spring arranged to bias the valve seal toward the closed position.

18 Claims, 11 Drawing Sheets

LIQUID DELIVERY NOZZLE WITH ANTI-DRIP VALVE

TECHNICAL FIELD

The present disclosure relates generally to liquid delivery nozzles and more particularly to a liquid delivery nozzle with an anti-drip valve.

BACKGROUND

Fuel oil, also referred to as heating oil or “red diesel,” is a combustible petroleum distillate used for heating homes and businesses. Fuel oil is delivered to customers on a regular basis, typically dispensing the fuel oil from a tank truck to an inlet pipe that leads to an indoor storage tank in the building. The tank truck has a deployable hose that terminates at a ball valve delivery nozzle having a ball valve that is operable between open and closed positions in response to moving a lever between corresponding open and closed positions.

SUMMARY

The present disclosure is directed to a delivery nozzle having a secondary valve that is configured and arranged to reduce or eliminate drips when the nozzle’s primary valve is in the closed position. For example, after dispensing fuel through the delivery nozzle, the user closes the primary valve to shut off flow, and the secondary valve automatically moves to the closed position to prevent fuel from dripping from the nozzle.

One aspect of the present disclosure is directed to a ball valve liquid delivery nozzle with an anti-drip valve. For example, the delivery nozzle is constructed for use with volatile and corrosive liquids, fuels, lubricant oils, methanol, biodiesel, diesel exhaust liquid, and other liquids. In one embodiment, the fluid delivery nozzle includes a housing with a handle portion defining an inlet and a transverse portion defining an outlet, where the transverse portion extends transversely to the handle portion and the housing defines a fluid pathway between the inlet and the outlet. A primary valve is in the handle portion and is manually operable between an open position and a closed position. A secondary valve in the housing is positioned downstream of the primary valve and operable between an open position and a closed position. The secondary valve includes a shaft fixedly retained in the transverse portion of the housing, a valve seal movable along the shaft, and a spring arranged to bias the valve seal toward the closed position.

In one embodiment, the secondary valve is configured to move to the open position in response to liquid in the fluid pathway exerting a force on the valve seal that exceeds a pre-defined threshold. For example, the pre-defined threshold is derived from a fluid pressure of 5-6 psi.

In some embodiments, the inside of the housing defines a valve seat, and in the closed position the valve seal forms a liquid-tight seal with the valve seat.

In another embodiment, the delivery nozzle includes an spud connector removably installed in the outlet and a hub retained in the transverse portion of the housing between the spud connector and a shoulder defined in the housing, where a distal end of the shaft is received in the hub, and where the spring is on the shaft between the hub and the valve seal. In one such embodiment, a proximal end of the shaft is received in a recess defined in an inside of the housing.

In some embodiments, the secondary valve includes a valve body movable along the shaft, where the valve seal is mounted on the valve body.

In some embodiments, the valve seal is made of an elastomer configured for use with corrosive liquids, such as petrochemicals.

In some embodiments, the valve seal is made of an elastomeric material, such as a fluoropolymer elastomer, a nitrile rubber elastomer, or a polyurethane.

In some embodiments, the delivery nozzle includes a retaining ring on a proximal end portion of the shaft, where the retaining ring defines a valve seat. In the closed position, the valve seal forms a liquid-tight seal with the valve seat. In one such embodiment, the retaining ring is retained in the fluid pathway in a region between the handle portion and the transverse portion.

In some embodiments, the secondary valve is configured as a poppet valve.

In some embodiments, the valve assembly is removably retained in the housing.

The present disclosure is also directed to a valve assembly for a fluid delivery nozzle. The valve assembly can be part of a delivery nozzle or provided as a stand-alone part or parts kit. In one embodiment, the valve assembly includes a shaft extending between a distal end portion and a proximal end portion. A valve seal is configured to be installed on the shaft and movable along the shaft. A hub has a central body defining an opening configured to receive the distal end portion of the shaft. A spring is configured to be installed on the shaft between the hub and the valve seal, where, in the installed position the spring is arranged to bias the valve seal toward the proximal end portion of the shaft.

In some embodiments, the valve assembly includes a valve body slidable along the shaft, where the valve seal is installed on the valve body. In one such embodiment, the valve seal has an annular geometry that is installed on the outside perimeter of the valve body.

In some embodiments, the valve seal is made of a fluoropolymer elastomer, nitrile, or polyurethane.

In some embodiments, the valve assembly includes a retaining ring configured to receive the proximal end portion of the shaft, where the retaining ring defines a valve seat. When the valve seal is in the closed position the valve seal forms a liquid-tight seal with the valve seat.

In some embodiments, the valve assembly is provided with a nozzle housing having a handle portion with an inlet and a transverse portion with an outlet, where the transverse portion extends transversely to the handle portion and the housing defining a fluid pathway between the inlet and the outlet. The nozzle housing is configured to receive the valve assembly in the transverse portion.

In some embodiments, a spud connector is configured to be installed in the outlet of the nozzle housing such that, when installed, the spud connector fixedly retains the hub in the nozzle housing.

In some embodiments, the spud connector includes a threaded nut, such as one configured to threadably engage male threads on a receptacle of a fuel storage tank.

In some embodiments, the nozzle housing has a ball valve in the handle portion of the nozzle housing, where the ball valve is configured as a primary valve that is manually operable between an open position and a closed position. The valve assembly is configured as a secondary valve that is automatically operable between a closed position and an open position.

The present disclosure is further directed to a spud connector with a valve assembly. In one such embodiment, the spud connector extends along a central axis between a first end portion and a second end portion, the first end portion including threads configured to mate with corresponding threads of a delivery nozzle. A valve assembly is retained in the spud connector and includes a first hub in the first end portion of the spud connector and a second hub in the second end portion of the spud connector. The first hub defines a central opening and the second hub defining a central opening. A shaft has a first end portion and a second end portion. A valve seal is on the shaft between the first end portion and the second end portion, where the valve seal is configured to form a seal with the first hub when in a closed position. The first end portion of the shaft is slidably received in the central opening of the first hub and the second end portion of the shaft is slidably received in the central opening of the second hub. A spring on the shaft is arranged to bias the valve seal towards the closed position.

In some embodiments, the valve assembly is configured as a poppet valve.

In some embodiments, the spud connector further includes a threaded nut on the second end portion.

In some embodiments, the valve assembly is compatible with biofuels.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the disclosed subject matter.

Figure 1:
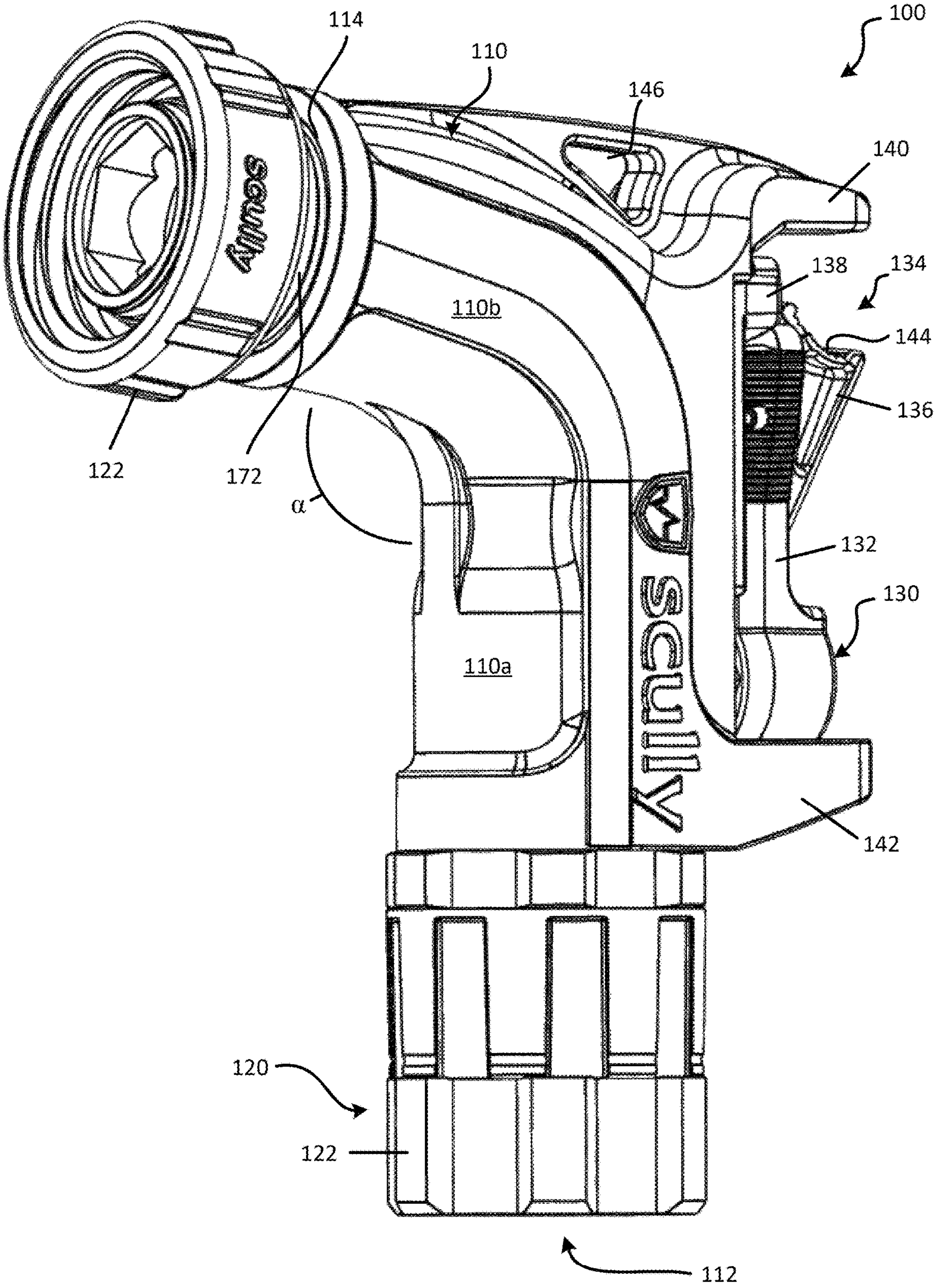
FIG. 1 is a front perspective view of a delivery nozzle, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Disclosed is a fluid delivery nozzle having a housing with a handle portion defining an inlet and a transverse portion defining an outlet, where the transverse portion extends transversely to the handle portion and the housing defines a fluid pathway between the inlet and the outlet. A primary valve in the handle portion is operable between an open position and a closed position. A secondary valve in the housing is positioned downstream of the primary valve and is operable between an open position and a closed position. The secondary valve includes a shaft fixedly retained in the transverse portion of the housing, a valve seal movable along the shaft, and a spring arranged to bias the valve seal toward the closed position. For example, when the primary valve is open, pressure of the liquid in the fluid pathway moves the valve seal to the open position. Upon closing the primary valve, the secondary valve moves automatically to the closed position, thereby preventing or reducing drips from the nozzle outlet. The secondary valve can be provided as part of a delivery nozzle assembly, as a stand-alone part, or as a parts kit. Numerous embodiments and variations will be apparent in light of the present disclosure.

Overview

Liquid dispensing nozzles are used for dispensing heating oil and other liquids. Also known as a hose nozzle or a nozzle attached to a fluid delivery hose, some existing nozzles use a ball valve configured to provide a high flow rate and low pressure drop, such as nozzles suited for bulk oil and fuel deliveries. In one such embodiment, the delivery nozzle has a full-port ball valve with an inlet swivel and an outlet spout that is useful for rapid fuel oil transfer.

Whether configured for use with heating oil, or other type of combustible or corrosive liquid, dripping the product on the ground after closing the main valve is both an environmental hazard and a safety hazard. To address this problem, fuel delivery nozzles have incorporated anti-drip valves downstream of the ball valve for opening and closing the liquid flow. In one example, the anti-drip valve closes under spring action when the pressure downstream of the primary valve drops rapidly. This valve is intended to close the flow of liquid stored in the delivery nozzle. In one existing anti-drip valve, a sealing assembly is fixed to a shaft that can move through a spoked hub, where the hub guides the shaft as it moves and supports the shaft. However, the shaft's motion limits the precision of the sealing. In particular, imprecise linear motion fosters inconsistencies in the sealing assembly's travel. Since sealing performance depends on the precise alignment of the valve, the motion of the shaft allows for inconsistent sealing performance with every spring return, leading to dripping and noise during use.

Despite advances in existing delivery nozzles, some challenges remain, including poor drip-reducing performance as well as undesirable vibration and noise when dispensing the liquid product. Another challenge is that existing anti-drip valves tend to have a short lifetime due to the corrosive nature of the product passing through the valve as well as the corrosive nature of cleaning formulations used on the delivery nozzle.

Another challenge with existing delivery nozzles is that the position of the primary valve latch allows the latch to be moved beyond the 90° position where it is fully open. When the latch is pivoted beyond this 90° position, the ball valve obstructs flow to some extent.

Accordingly, a need exists for improvements to anti-drip valves for ball-valve delivery nozzles, such as those used with fuels and corrosive liquids. The present disclosure addresses this need by providing a delivery nozzle configured for rapid delivery of heating oils and other combustible petroleum products. In one example embodiment, the delivery nozzle has a primary valve configured as a ball valve that is operable by toggling a lever between a closed position (e.g., aligned with the handle) and a closed position (e.g., 90° to the handle). The delivery nozzle has a secondary valve that closes automatically when the liquid pressure drops below a threshold value, as occurs when the primary valve is closed. The secondary valve functions to prevent or reduce drips and includes a valve body that is movable along a fixed shaft between an open position and a closed position. The valve body is spring-biased rearward toward the closed position where the valve body contacts a sealing face of the housing or a retaining ring on the shaft. The valve opens when the force of pressurized liquid in the nozzle is above the threshold pressure and causes the valve body to move forward along the shaft against the force of the spring. The secondary valve may be configured as a poppet valve in some embodiments. Since movement of the valve body is guided along the fixed shaft, the valve has consistent sealing alignment and therefore results in consistent sealing during use. Accordingly, drips and chatter are reduced, and performance is improved.

In some embodiments, the latch is configured to stop against the nozzle housing when pivoted 90° to the fully open position. For example, the housing is configured to contact the latch to prevent over-rotation of the latch beyond the fully open position.

A delivery nozzle according to the present disclosure can be configured for use with heating oil, diesel, gasoline, biofuels, and other combustible and non-combustible liquids. The delivery nozzle is not restricted to such products and similarly could be used with foods, water, and other liquid products.

EXAMPLE EMBODIMENTS

Figure 2:
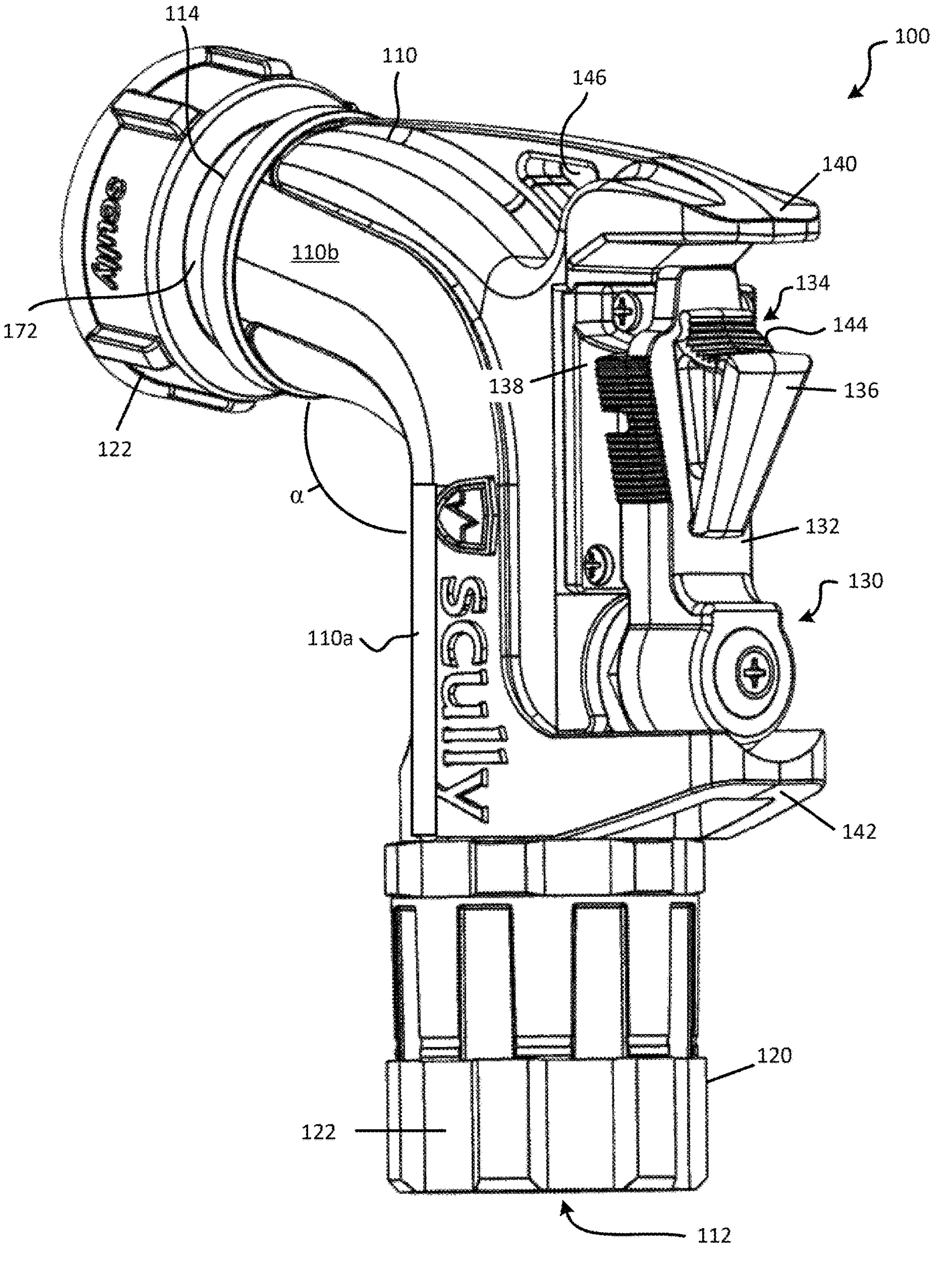
FIG. 2 is a rear perspective view of the delivery nozzle of FIG. 1.

FIGS. 1 and 2 illustrate front and rear perspective views, respectively, of a delivery nozzle 100 in accordance with an embodiment of the present disclosure. The delivery nozzle 100 includes a housing 110 that extends from an inlet 112 to an outlet 114 and defines a passageway 116 (not visible; shown in FIG. 4) for flow of a liquid through the housing 110. In this example, the delivery nozzle 100 has a bend or corner that defines an angle $\alpha$ from 45° to 135°, including 90°-120°, and about 100° between a first portion 110*a* that includes the inlet 112, and a second or transverse portion 110*b* that includes the outlet 114. The first portion 110*a* can also be referred to as a grip portion or handle portion in some embodiments. The user can grasp the housing 100 and/or a connected conduit adjacent the inlet 112 and direct the outlet 114 to the intended delivery location. The top of the housing 110 can define a through opening 146 suitable for connecting a strap, handle, chain, rope, or connector to the delivery nozzle 100.

The delivery nozzle 100 can include a connector 120 at the inlet 112 that is configured to sealingly attach to a conduit, such as a flexible hose of a fuel delivery truck. The connector 120, also referred to as a first connector, a first spud connector, or an inlet connector, can be configured with male threads for being threaded into the nozzle inlet 112. In other embodiments, the connector 120 includes a quick-disconnect hose coupling.

In some embodiments, the delivery nozzle 100 includes a spud connector 172 connected to the outlet 114 and configured to sealingly engage a pipe or tank inlet, such as using a threaded nut 122 or quick-disconnect fitting. The spud connector 172 at the outlet 114, also referred to as a second connector or outlet connector, can include male threads for being threaded into the outlet 114 of the housing 110. As needed, the spud connector 120 can include a threaded nut 122 for threadably engaging a male thread on the conduit, or vice versa. During use, for example, the spud connector 120 at the outlet 114 can be threadably attached via the nut 122 to the inlet of a storage tank (not shown) so that the outlet 114 is connected in a sealed manner to the storage tank for delivery of liquid (e.g., a fuel) to the storage tank.

Figure 5:
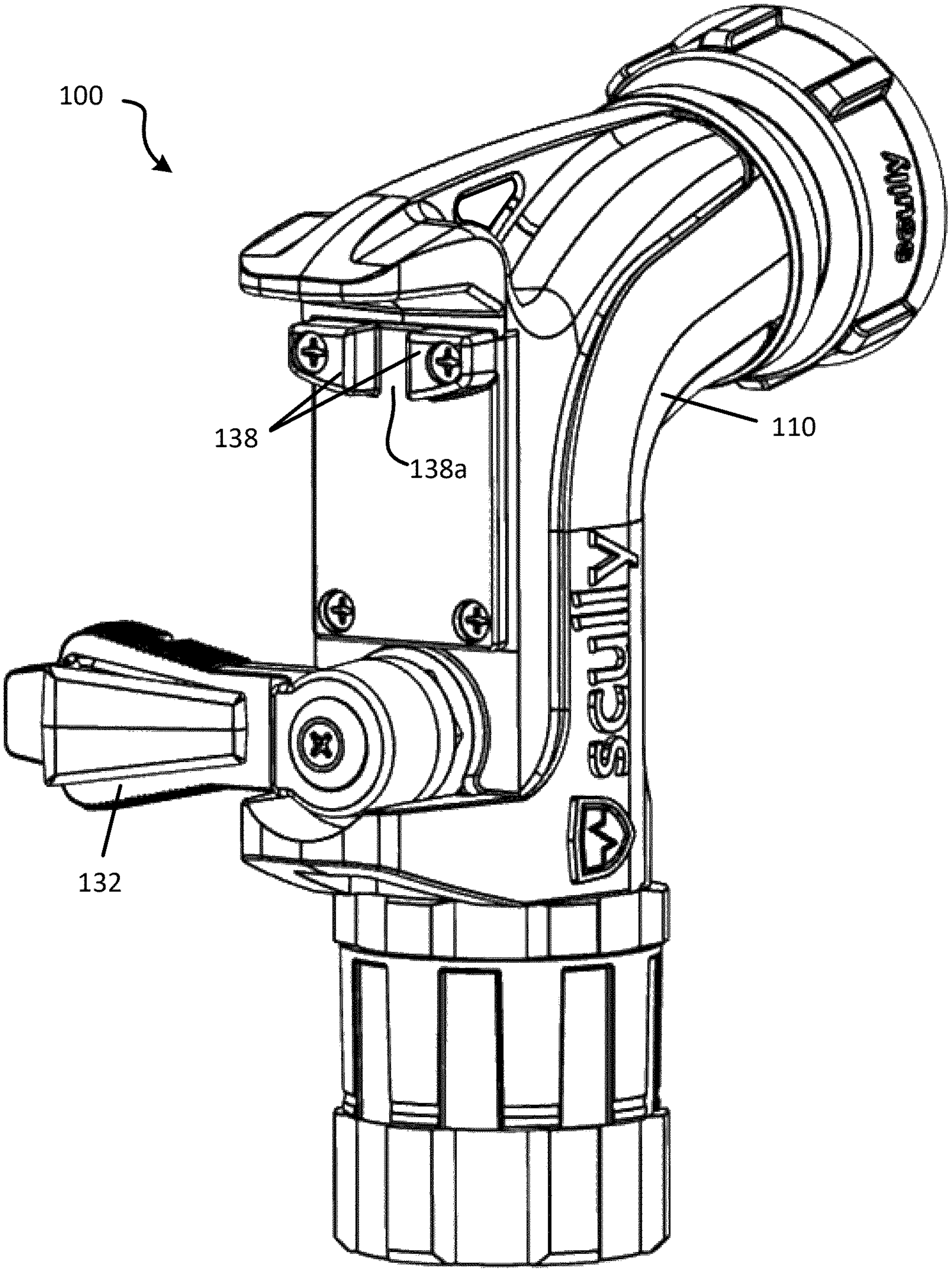
FIG. 5 is a rear perspective view showing a delivery nozzle with a primary valve in an open position, in accordance with an embodiment of the present disclosure.

The fuel delivery nozzle 100 includes a first or primary valve 130 operable to open and close flow through the nozzle 100. In this example, the primary valve 130 is a ball valve, such as a two-position ball valve operable with a lever or handle 132. Other valve types can be used as deemed appropriate for a particular application or for a particular liquid to be dispensed. In the example of FIGS. 1-2, the handle 132 is in a closed position with the handle 132 aligned along the housing 110. The handle 132 can be pivoted about 90° to a fully open position, such as shown in FIG. 5. Between the closed position and the fully open position, the handle 132 can be positioned in a partially open state, such as to throttle liquid flow.

The handle 132 includes a latch 134 to prevent inadvertent opening of the primary valve 130. In this example, the latch 134 includes a catch portion 136 that is slidable along the handle 132 between a non-blocking position and a blocking position with respect to a block 138 on the housing 110. In one embodiment, the block 138 defines a channel that receives part of the catch portion 136 when the catch portion is in the blocking position. Accordingly, the handle 132 is blocked from pivoting either left or right to an open position. In other embodiments, the block 138 obstructs movement of the handle 132 in only one direction, such as when the handle 132 has only one open position (e.g., pivoting the handle 132 counter-clockwise to open as viewed from the rear of the delivery nozzle 100). The catch portion 136 is spring biased toward the blocking position. To move the handle 132 to the open position, for example, the user can press down on the catch portion 136 to move it out of engagement with the block 138, followed by pivoting the handle 132 to the open position.

In some embodiments, the lever 132 and latch 134 are positioned between an upper guard 140 and a lower guard 142 on the housing to prevent or reduce inadvertent unlocking of the latch 134 and to reduce damage to the lever 132 and latch 134. In some embodiments, the catch portion 136 defines a concave thumb rest 144 for the user. For example, the thumb rest 144 has a concave, upward-facing geometry and includes knurling for improved grip with a glove or the like.

Figure 3A:
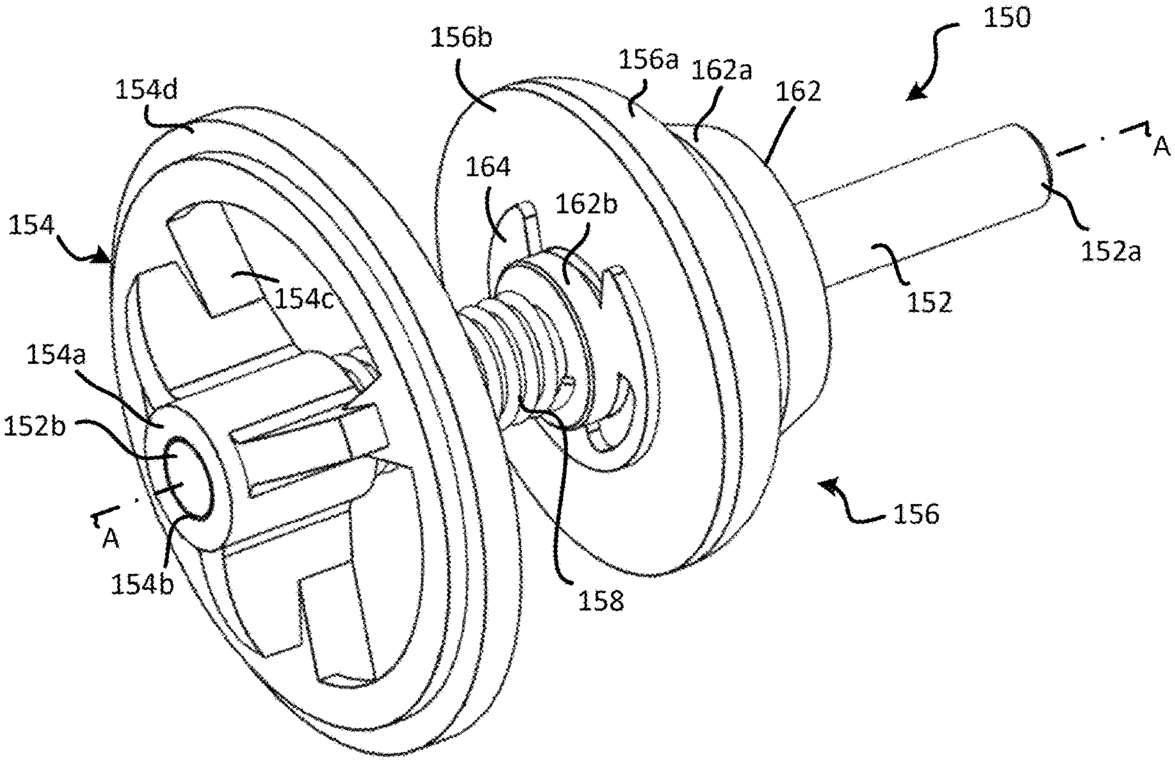
FIGS. 3A and 3B illustrate front and rear perspective views, respectively, of a secondary valve assembly, in accordance with an embodiment of the present disclosure.
Figure 3B:
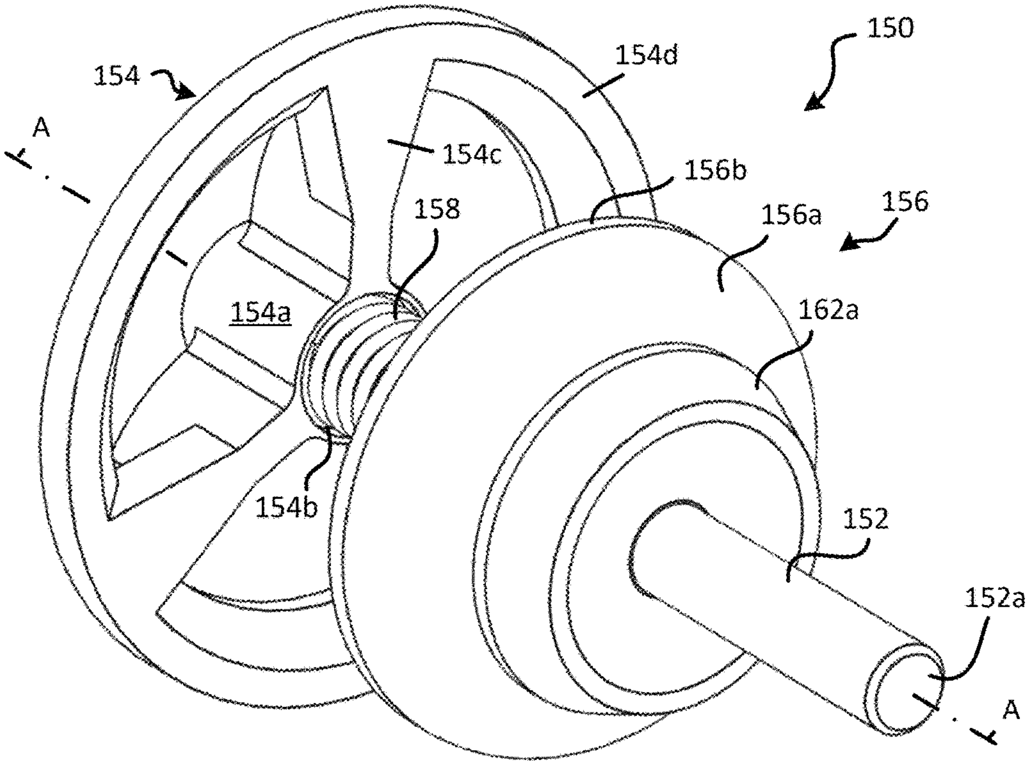

FIGS. 3A and 3B illustrate front and rear perspective views, respectively, of a secondary valve 150, in accordance with an embodiment of the present disclosure. In this example, the secondary valve 150 includes a valve stem or shaft 152, a hub 154, a valve guide 162, a valve seal 156, a spring 158, and a retaining ring 164. The secondary valve 150 may have more or fewer components as deemed necessary for a particular application. The shaft 152 extends along a central axis A from the proximal or first end 152*a* to the distal or second end 152*b*, which is received in the hub 154. In some embodiments, the shaft 152 can be a cylindrical rod of uniform diameter and having a smooth finish; other configurations are acceptable, including a fluted rod, threaded rod, and a shaft with multiple regions of different diameters, for example.

As shown in this example, the hub 154 has a central body 154*a* that defines a central opening 154*b* sized and configured to receive the shaft 152. A plurality of spokes 154*c* extend radially outward from the central body to an outer periphery 154*d* of the hub 154. Spokes 154*c* can be configured to direct liquid flow, such as to impart a radially outward or spiral flow pattern through the hub 154.

A spring 158 is on the shaft 152 between the hub 154 and the valve seal 156. For example, the spring 158 is a coil spring that coils around the shaft 152. The valve seal 156 includes a valve body 156*a* of annular shape that is supported by a washer 156*b* at its distal face. In some embodiments, the valve body 156*a* can be made of materials that eliminate the need for the washer 156*b*, or the washer 156*b* can be integral to the valve body 156*a*, for example. The valve body 156*a* and washer 156*b* are installed on a valve guide 162 that can slide along the shaft 152, where the valve body 156*a* is retained axially between a proximal part 162*a* and a distal part 162*b* of the valve guide 162. In some embodiments, the valve body 156*a* can be integrally formed with the valve guide 162 as a single component. As needed, a circlip or other retaining ring 164 can be used to secure the washer 156*b* on the valve guide 162 and/or to provide a rigid structure for engaging the spring 158, in some embodiments.

The valve body 156*a* can be made of an elastomeric material selected to deform sufficiently to form a liquid-tight seal with the valve seat 160. Alternately, the valve body 156*a* can be made of a metal or other generally rigid material, such as when the valve seat 160 (discussed below) defines a corresponding surface to mate with and form a seal with the valve seat 160. The material can further be selected for compatibility with volatile liquids, corrosive liquids, and petrochemicals, for example. Examples of some materials suitable for use with gasoline, diesel, and oils include fluorinated propylene elastomers (e.g., "FKMs"), nitrile rubber elastomers, and polyurethane. One such fluorinated elastomer is sold under the trade name Viton®. The specific material of the valve body 156*a* can be selected based on the spring force, sealing area of the valve seat 160, fuel delivery pressure, the type of liquid intended to be dispensed, chemical resistance, and hardness, for example. The valve body 156*a* can have a circular cross-sectional profile (e.g., an O-ring), a trapezoidal profile, a wedge profile, or some other shape. Further, in some embodiments, the valve body 156*a* can be hollow, have a C-shape, or otherwise define a void that facilitates deformation when pressed against the valve seat 160.

Figure 4:
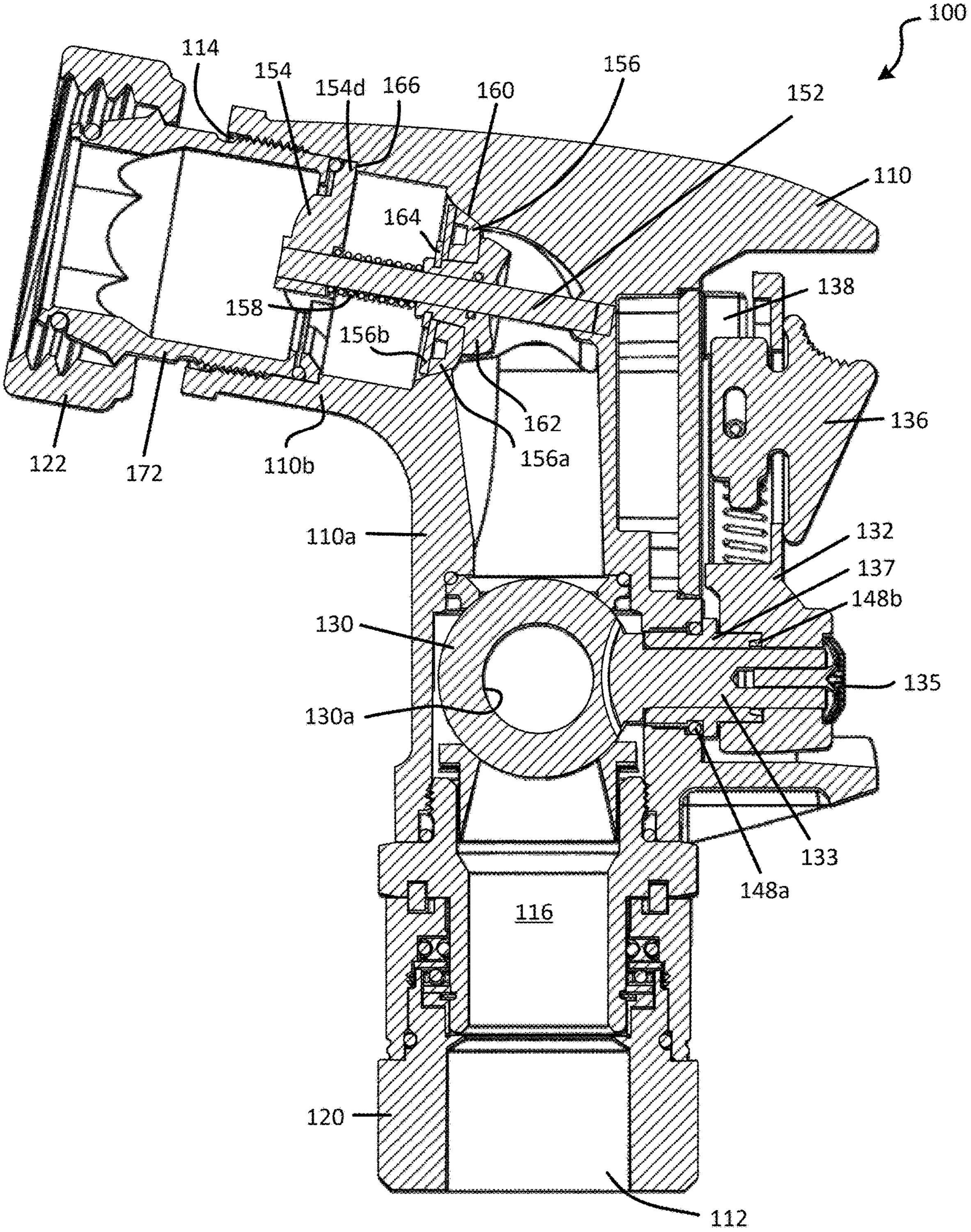
FIG. 4 is a cross-sectional view of a delivery nozzle having primary and secondary valves, in accordance with an embodiment of the present disclosure.

Turning now to FIG. 4, a cross-sectional view shows a delivery nozzle 100 with a primary valve 130 and a secondary valve 150, in accordance with an embodiment of the present disclosure. In this example, the primary valve 130 is closed with the handle 132 aligned along the first portion 110*a* of the housing 110. As discussed above, the passageway 116 extends between the inlet 112 and the outlet 114. The primary valve 130 is positioned downstream of the inlet 112 to block or permit liquid flow through the delivery nozzle 100. Here, since the through-opening 130*a* of the primary valve is normal to fluid flow, the primary valve 130 is closed. The handle 132 is connected to an actuator 133 by a fastener 135. The actuator is received through a collar 137 that is sealed to the housing 110 by an O-ring seal 148*a* or the like. Another seal 148*b* is between the actuator 133 and then handle 132. Seal 148*b* can be made of polytetrafluoroethylene (PTFE) or similar materials, for example. Seals 148*a*, 148*b* function to prevent leaks through the primary valve 130 during operation.

The secondary valve 150, sometimes referred to as an anti-drip valve, is positioned downstream of the primary valve 130 and adjacent the outlet 114. For example, the secondary valve 150 is contained completely or in majority part in the transverse portion 110*b* of the housing 110. The shaft 152 is retained between an inside of the housing 110 and the hub 154, which is positioned in the passageway 116 adjacent the outlet 114. The shaft 152 can be immovably retained, or at least axially immovably retained, in the housing 110 so that the valve seal 156 can slide along the shaft 152 between open and closed positions. In some embodiments, "immovably retained" includes zero axial movement or limited axial movement of the shaft 152 that does not affect function of the valve 150. In this example, the first end 152*a* (e.g., proximal end) of the shaft 152 is received in a rear wall of the housing 110 and the opposite second end 152*b* (e.g., distal end) is received in the hub 154. In some embodiments, one or both ends 152*a*, 152*b* can be retained in the respective location by use of a fastener, a weld, threaded engagement, slip fit, or other suitable method. In one example, the first end 152*a* of the shaft 152 is received in a recess in the housing 110 while the second end 152*b* of the shaft 152 threadably engages the hub 154 or is formed as one piece with the hub 154.

The spring 158 between the hub 154 and the valve seal 156 acts on the distal part 162*b* of the valve guide 162 to bias the valve seal 156 towards a closed position where it contacts the valve seat 160. In this example, the valve seat 160 is positioned rearward or upstream of the hub 154. In some embodiments, the valve seat 160 can be located at or closely adjacent (e.g., within ¼ inch) of the outlet 114 to minimize the volume of liquid that could be retained between the valve seal 156 and the outlet 114. In some embodiments, the valve seat 160 is or includes a frustoconical surface or an annular surface that expands in diameter moving axially towards the outlet 114. For example, the valve seat 160 can have a profile that is linear, curved, or a complex shape. In one embodiment, the valve seat 160 extends at about 45° to the axis A of the shaft 152. In other embodiments, the valve seat 160 can have a shallower angle (e.g., 20-30°) that functions as a sealing taper, for example. In yet other embodiments, the valve seat 160 resembles an annular recess that is oriented generally perpendicular to the axis A of the shaft 152 (e.g., ±5°) and can be planar, curved, or grooved, for example. Numerous variations and embodiments will be apparent in light of the present disclosure.

In one embodiment, the outer periphery 154*d* of the hub 154 is received between a shoulder 166 defined in the housing 110 and an end of the spud connector 172, an adapter, retaining ring, or other component that is threadably installed into the outlet 114. For example, after installing the hub 154, the spud connector 172 is installed into the outlet 114 to retain the hub 154 and valve assembly in the nozzle 100. In other embodiments, the hub 154 is retained using a retaining ring, can threadably engage the inside of the housing 110, or otherwise can be fixed into the housing 110, such as by welding. By using a removable connector 172, the secondary valve 150 can be configured to be removable and/or replaceable as may be needed for repair or replacement. For example, the secondary valve 150 can be replaced if failing to seal effectively, or the secondary valve 150 (or individual components thereof) can be replaced with another secondary valve 150 (or individual components) incorporating materials that are better suited for a given application.

FIG. 5 illustrates a rear perspective view of the delivery nozzle 100 with the handle 132 in an open position, in accordance with an embodiment of the present disclosure. The block 138 is exposed and defines a channel 138*a* to receive part of the catch portion 136 when the handle 132 is in the closed position. Here, the block 138 includes two distinct sections that are laterally spaced apart on the rear face of the housing. In other embodiments, the block 138 can be a single structure that defines a channel 138*a*.

Figure 6:
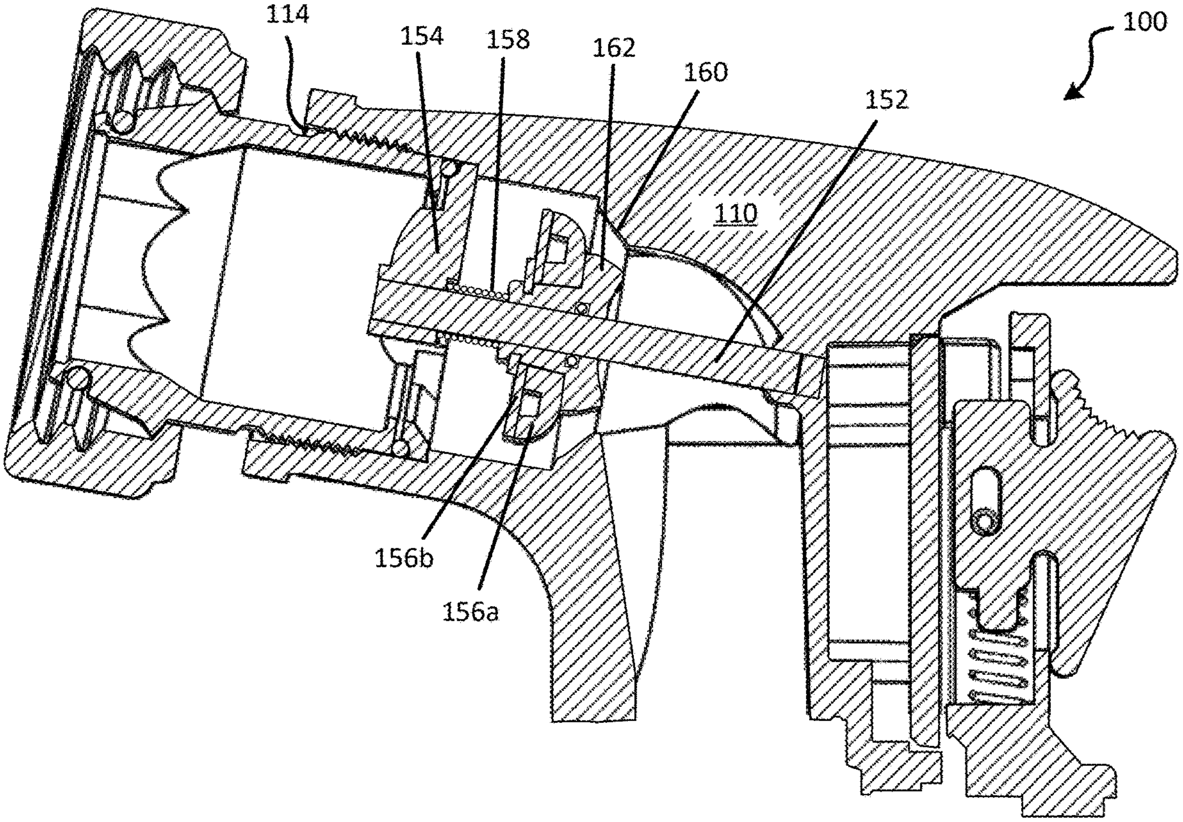
FIG. 6 is a cross-sectional view showing part of a delivery nozzle with a secondary valve in an open position, in accordance with an embodiment of the present disclosure.

Referring now to FIG. 6, a cross-sectional view shows part of a delivery nozzle 100 with the secondary valve 150 in an open position. Compared to the position shown in FIG. 3, the valve body 156*a*, washer 156*b*, and valve guide 162 have moved against spring pressure along the shaft 152 towards the outlet 114. The shaft 152 has not moved and remains fixed to the housing 110 and hub 154. Note that the spring 158 is compressed. In this open position, liquid can flow between the valve seat 160 and the valve body 156*a*.

Figure 7:
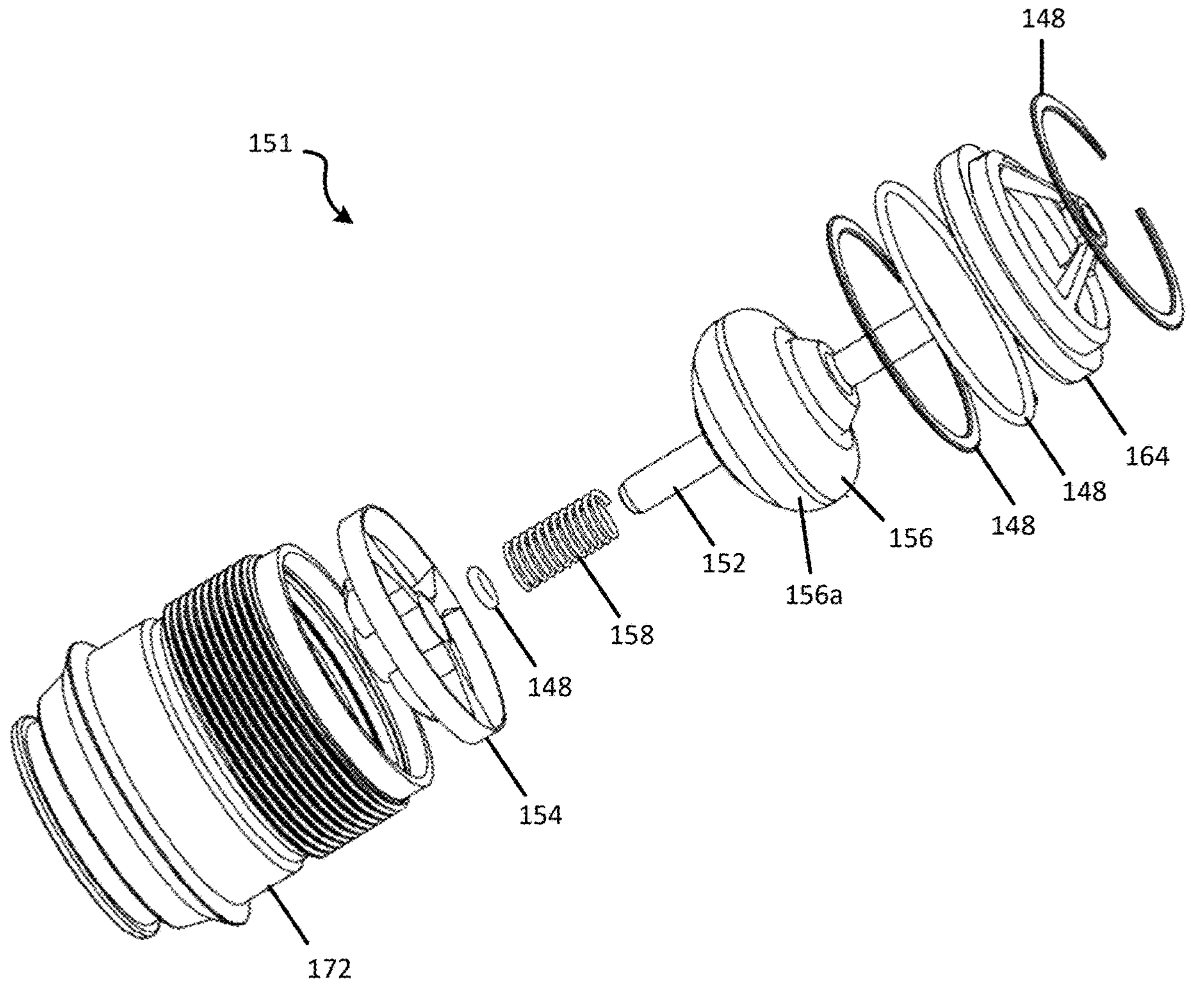
FIG. 7 is an exploded, side view showing components of a spud fitting with an anti-drip valve, in accordance with another embodiment of the present disclosure.
Figure 8:
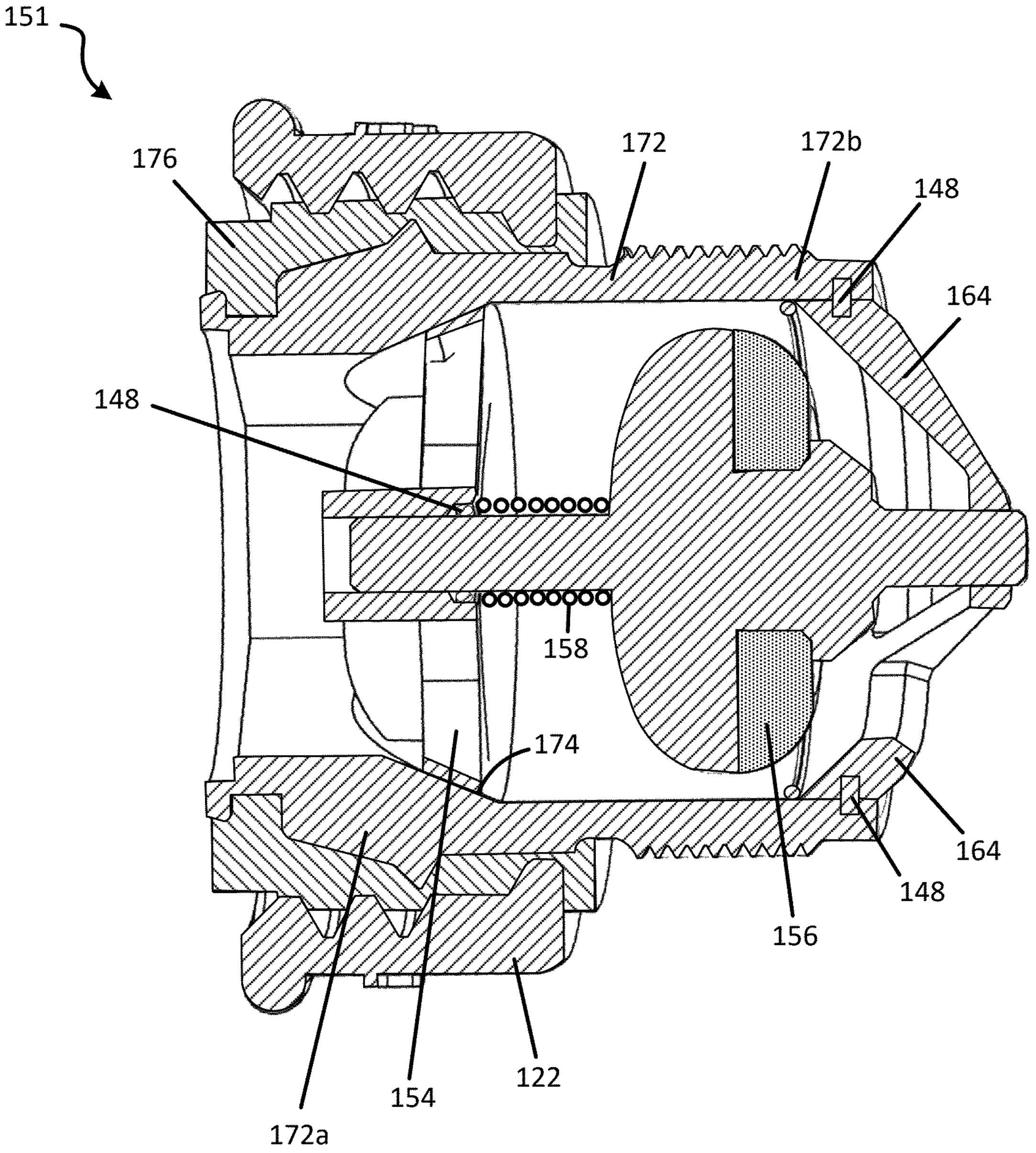
FIG. 8 is a side, cross-sectional view of a spud fitting with an anti-drip valve, in accordance with an embodiment of the present disclosure.

Referring now to FIGS. 7 and 8, a side, exploded view and a side, cross-sectional view, respectively, illustrate a spud connector 172 and valve assembly 151, in accordance with another embodiment of the present disclosure. The valve assembly 151 is configured to be contained within the spud connector 172, which is configured to be installed in the outlet 114 of the delivery nozzle 100. In FIG. 8, the spud connector 172 is shown with a threaded nut 122, which can be provided with the spud connector 172 or provided as a separate component. Optionally, a sleeve 176 is between the spud connector 172 and the threaded nut 122. Components of the valve assembly 151 are contained in the spud connector 172, resulting in a seal that is located within the spud connector 172 and closely adjacent the housing outlet 114. This location of the sealing interface further reduces the propensity for drips compared to other valves.

In this example, the valve assembly 151 includes a valve seal 156 that is coupled to a valve body 156*a*. The valve body 156*a* is fixed to a shaft 152 or can be formed as a single piece with the shaft 152. The shaft 152 is slidably retained between a hub 154 and a retaining ring 164. In this example, the retaining ring 164 is similar in construction to the hub 154 and therefore may be referred to as an upstream hub 164. The hub 154 accordingly may by referred to as a downstream hub 154. The hub 154 and retaining ring 164 each define a central opening sized to receive and guide the shaft 152 during operation. During use while dispensing a liquid, the thrust of the liquid displaces the valve seal 156, valve body 156*a*, and shaft 152 axially against force of the spring 158 to an open position, such as shown in FIG. 8. In the open position, the liquid can flow through the valve assembly 151 and out through the spud connector 172. When the primary valve 130 is closed, the spring 158 returns the valve 156 to the closed position in contact with and forming a seal with the retaining ring 164.

In the assembled state, such as shown in FIG. 8, the hub 154 is retained in a distal end portion 172*a* of the spud connector 172. In this example, the distal end portion 172*a* defines a taper 174 against which the hub 154 is received. The retaining ring 164 is retained in the proximal end portion 172*b* of the spud connector 172, such as by using one or more seals 148, split rings, or the like. The shaft 152 can move axially (i.e., along its length) through or between the hub 154 and the retaining ring 164, resulting in corresponding movement of the valve seal 156. The valve seal 156 is configured as a poppet-type seal 156 of elastomeric material that can form a seal with the retaining ring 164 when the valve assembly 151 is in the closed position. When pressurized fluid acts on the valve seal 156, it moves with the shaft 152 against force of the spring 158 to an open position and allows fluid flow through the valve assembly 151.

Figure 9A:
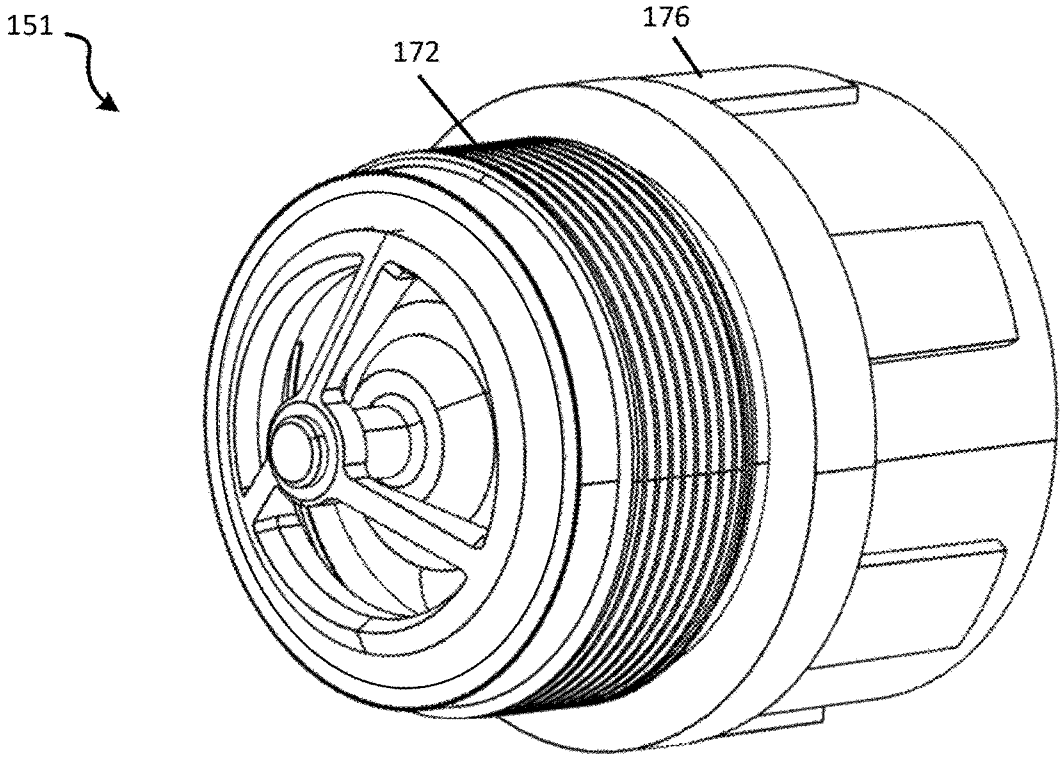
FIG. 9A is a rear perspective view of a spud fitting with an anti-drip valve, in accordance with an embodiment of the present disclosure.
Figure 9B:
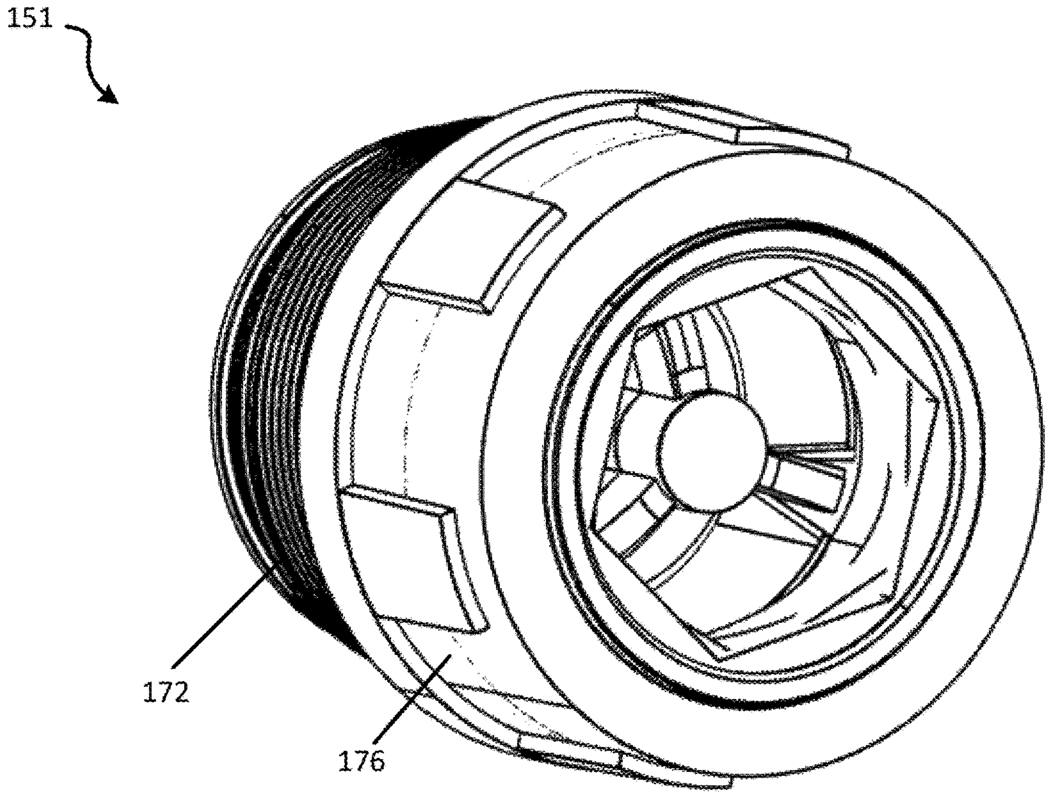
FIG. 9B is a front perspective view of the spud fitting with anti-drip valve of FIG. 9A.

FIGS. 9A and 9B illustrate rear and front perspective views of the valve assembly 151, in accordance with some embodiments. In this example, the valve assembly 151 includes the sleeve 176 is on the spud connector 172.

Figure 10A:
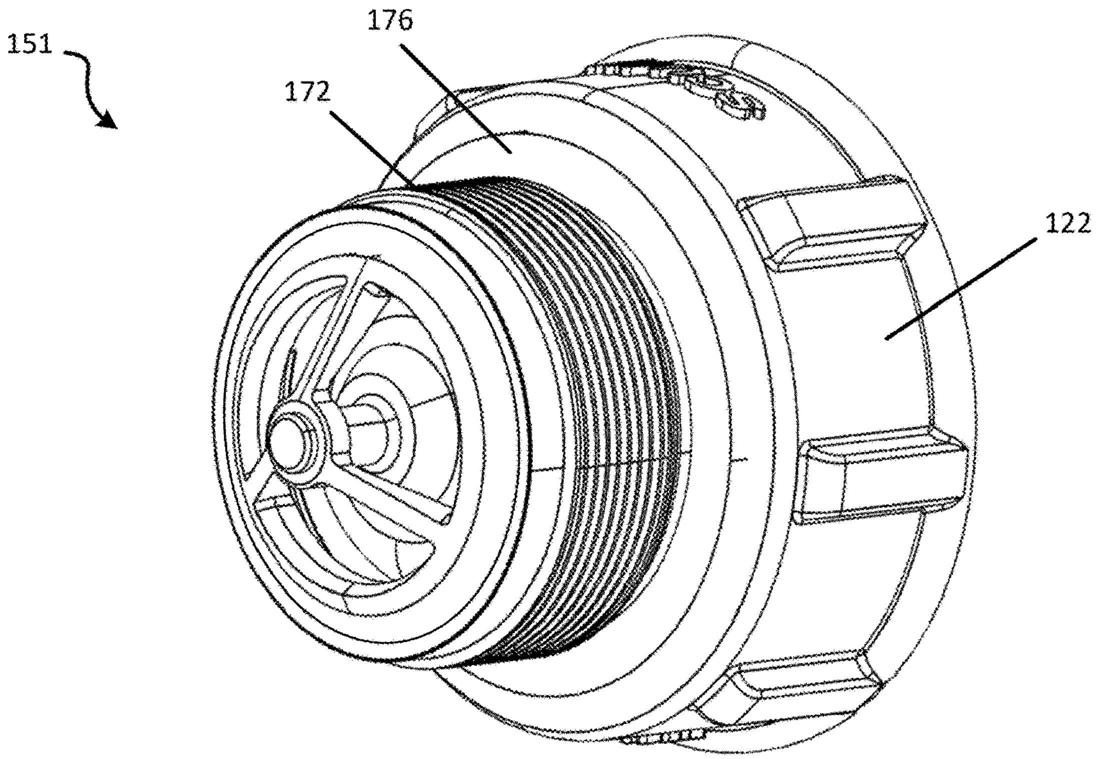
FIG. 10A is a rear perspective view showing an assembly with the spud fitting of FIG. 9A and a threaded coupler, in accordance with an embodiment of the present disclosure.
Figure 10B:
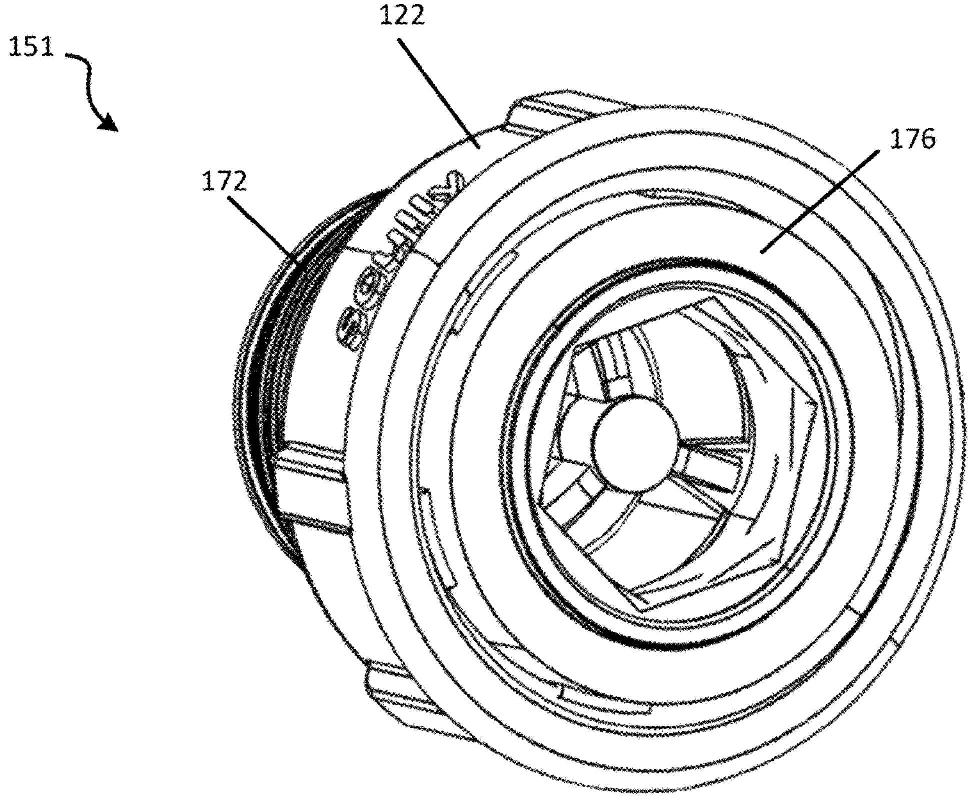
FIG. 10B is a front perspective view of the assembly of FIG. 10A.

FIGS. 10A and 10B illustrate rear and front perspective views of the valve assembly 151, in accordance with another embodiment of the present disclosure. In this example, the valve assembly 151 includes the sleeve 176 and threaded nut 122 on the spud connector 172.

Figure 11:
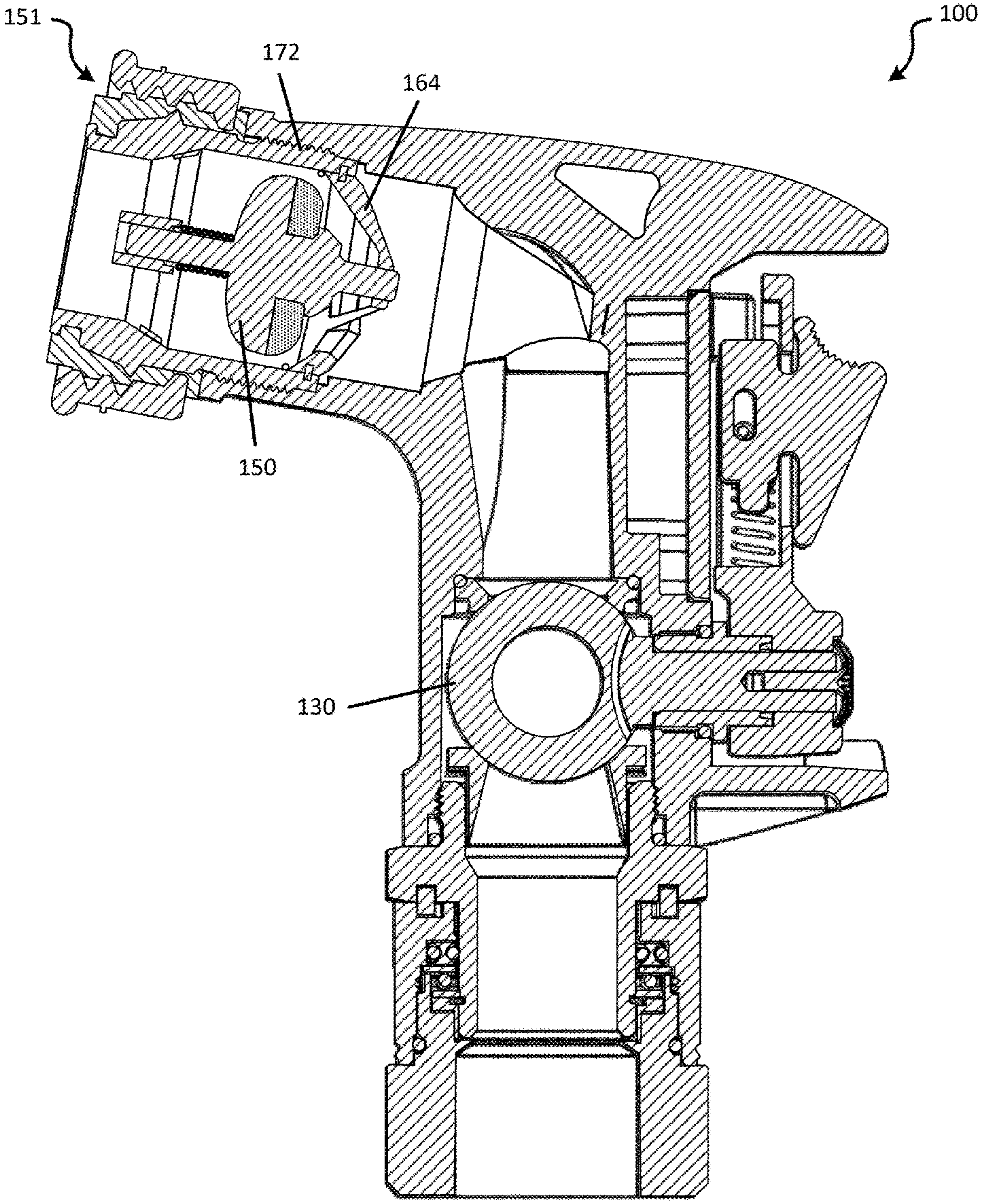
FIG. 11 is a cross-sectional view of a delivery nozzle with a spud fitting that includes an anti-drip valve, in accordance with an embodiment of the present disclosure.

FIG. 11 is a cross-sectional view of a delivery nozzle 100 with a valve assembly 151 that includes a secondary valve 150 housed in the spud connector 172, in accordance with an embodiment of the present disclosure. The delivery nozzle 100 includes a primary valve 130 configured as a ball valve. In this example, the secondary valve 150 is in an open state with the valve seal 156 spaced from the retaining ring 164.

In use, embodiments of the valve assembly 151 function as a secondary valve to prevent or reduce drips in a delivery nozzle having a primary valve, such as a ball valve. When fluid flow stops due to closing the primary valve, the secondary valve moves automatically to the closed position to prevent or greatly reduce drips from liquid that may remain in the delivery nozzle 100 downstream of the primary valve. In some embodiments, the valve assembly 151 is part of a spud connector 172 that can be removably installed in the outlet 114 of the delivery nozzle 100. Such embodiments enable removal of the spud connector 172 so that the valve assembly 151 can be serviced, or so that a different spud connector can be installed, for example. Materials of construction and spring forces can be selected for a given application. In one example, the valve assembly 151 is configured for use in a delivery nozzle 100 configured for bulk delivery of fuels or other corrosive and/or volatile liquids, including biofuels. In another example, the valve assembly 151 is part of a delivery nozzle configured for use with other liquid products.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

The invention claimed is:

1. A fluid delivery nozzle comprising:

a housing with a handle portion defining an inlet and a transverse portion defining an outlet, the transverse portion extending transversely to the handle portion, the housing defining a fluid pathway between the inlet and the outlet;

a primary valve in the handle portion and manually operable between an open position and a closed position;

a secondary valve in the housing, the secondary valve positioned downstream of the primary valve and operable between an open position and a closed position, the secondary valve comprising:

a shaft fixedly retained in the transverse portion of the housing;

a valve seal movable along the shaft; and a spring arranged to bias the valve seal toward the closed position;

a spud connector configured to be removably installed in the outlet; and a hub configured to be retained in the transverse portion of the housing between the spud connector and a shoulder defined in the housing, wherein a distal end of the shaft is received in the hub, and the spring is on the shaft between the hub and the valve seal.

2. The fluid delivery nozzle of claim 1, wherein the secondary valve is configured to move to the open position in response to liquid in the fluid pathway exerting a force on the valve seal when the force exceeds a pre-defined threshold.

3. The fluid delivery nozzle of claim 1, wherein an inside of the housing defines a valve seat, and in the closed position, the valve seal forms a liquid-tight seal with the valve seat.

4. The fluid delivery nozzle of claim 1, wherein a proximal end of the shaft is received in a recess defined in an inside of the housing.

5. The fluid delivery nozzle of claim 1, wherein the secondary valve comprises a valve body movable along the shaft, wherein the valve seal is mounted on the valve body.

6. The fluid delivery nozzle of claim 5, wherein the valve seal is made of a fluoropolymer elastomer, a nitrile rubber elastomer, or a polyurethane.

7. A fluid delivery nozzle, comprising:

a housing with a handle portion defining an inlet and a transverse portion defining an outlet, the transverse portion extending transversely to the handle portion, the housing defining a fluid pathway between the inlet and the outlet;

a primary valve in the handle portion and manually operable between an open position and a closed position; and a secondary valve in the housing, the secondary valve positioned downstream of the primary valve and operable between an open position and a closed position, the secondary valve comprising:

a shaft fixedly retained in the transverse portion of the housing;

a valve seal movable along the shaft; and a spring arranged to bias the valve seal toward the closed position;

a retaining ring on a proximal end portion of the shaft between the spring and the valve seal;

wherein the valve assembly is removably retained in the housing.

8. The fluid delivery nozzle of claim 7, wherein the secondary valve is configured as a poppet valve.

9. A valve assembly for a fluid delivery nozzle, the valve assembly comprising:

a housing with a handle portion defining an inlet and a transverse portion defining an outlet, wherein the transverse portion extends transversely to the handle portion and the housing defines a fluid pathway between the inlet and the outlet;

a valve assembly comprising:

a shaft extending between a distal end portion and a proximal end portion;

a valve seal configured to be installed on the shaft and movable along the shaft when installed; and a hub with an outer body and a central body defining an opening configured to receive the distal end portion of the shaft;

a spring configured to be installed on the shaft between the hub and the valve seal, wherein in the installed position the spring is arranged to bias the valve seal toward the proximal end portion of the shaft;

wherein the valve assembly is configured to be removably retained in the outlet of the housing; and a spud connector configured to be installed in the outlet of the housing, wherein when installed, the spud connector fixedly retains the valve assembly in the nozzle housing.

10. The valve assembly of claim 9, comprising a valve body slidable along the shaft, wherein the valve seal is installed on the valve body.

11. The valve assembly of claim 9, wherein the valve seal is made of a fluoropolymer elastomer, a nitrile rubber elastomer, or a polyurethane.

12. The valve assembly of claim 9, comprising:

a retaining ring configured to be installed on the shaft between the valve seal and the spring.

13. The valve assembly of claim 9, comprising:

wherein when installed, the spud connector engages the outer body of the hub.

14. The valve assembly of claim 13, wherein the nozzle housing has a ball valve in the handle portion of the nozzle housing, the ball valve configured as a primary valve that is manually operable between an open position and a closed position, wherein the valve assembly is configured as a secondary valve that is automatically operable between a closed position and an open position.

15. A valve assembly comprising:

a spud connector extending along a central axis between a first end portion and a second end portion, the first end portion including threads configured to mate with corresponding threads of a delivery nozzle;

a valve assembly retained in the spud connector and comprising:

a first hub in the first end portion of the spud connector, the first hub defining a central opening;

a second hub in the second end portion of the spud connector, the second hub defining a central opening;

a shaft with a first end portion and a second end portion;

a valve seal on the shaft between the first end portion and the second end portion, the valve seal configured to form a seal with the first hub when in a closed position;

wherein the first end portion of the shaft is slidably received in the central opening of the first hub and the second end portion of the shaft is slidably received in the central opening of the second hub;

a spring on the shaft, the spring arranged to bias the valve seal towards the closed position.

16. The valve assembly of claim 15, wherein the valve assembly is configured as a poppet valve.

17. The valve assembly of claim 15, further comprising a threaded nut on the second end portion of the spud connector.

18. The valve assembly of claim 15, wherein the valve assembly is compatible with biofuels.

* * * * *